(12) United States Patent
Hart

(10) Patent No.: US 8,582,541 B2
(45) Date of Patent: Nov. 12, 2013

(54) APPENDING A RANGING WAVEFORM TO A FRAME TO MAINTAIN COMMUNICATION PROTOCOL INTEROPERABILITY

(75) Inventor: Brian Donald Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1421 days.

(21) Appl. No.: 12/038,108

(22) Filed: Feb. 27, 2008

(65) Prior Publication Data

US 2009/0213820 A1 Aug. 27, 2009

(51) Int. Cl.
*H04W 4/00* (2009.01)
*H04B 7/212* (2006.01)

(52) U.S. Cl.
USPC .......................................... 370/338; 370/348

(58) Field of Classification Search
USPC ......... 370/338, 348, 350, 455, 447, 478, 466, 370/469, 394, 474, 475, 476; 455/73, 91
See application file for complete search history.

(56) References Cited

U.S. PATENT DOCUMENTS

| | | | |
|---|---|---|---|
| 6,252,882 B1 * | 6/2001 | Matsui ........................ | 370/441 |
| 7,068,704 B1 | 6/2006 | Orr | |
| 2006/0045083 A1 | 3/2006 | Hasty, Jr. et al. | |
| 2007/0014267 A1 * | 1/2007 | Lam et al. ..................... | 370/338 |
| 2007/0297382 A1 * | 12/2007 | Webster et al. ............... | 370/338 |
| 2009/0141692 A1 * | 6/2009 | Kasslin et al. ................ | 370/338 |

OTHER PUBLICATIONS

Breezecom Wireless Communication; 1997; A technical tutorial on IEEE 802.11 protocol.*
Zafer Sahinoglu and Sinan Gezici, Ranging in the IEEE 802.15.4a Standard, Mitsubishi Electric Research Laboratories, Inc., TR2006-097, Dec. 2006.
Hanbing Shen et al., DS-PAM UWB System Using Non-linear Chirp Waveform, ETRI Journal, vol. 29, No. 3, Jun. 2007.
Syed Aon Mujtaba, Technical Specification for the MAC and the PHY layer of the TGn Sync Proposal to IEEE 802.11 TGn; IEEE P802.11 Wireless Lans, May 1, 2005, pp. 1-134, XP002340381.
John V. Lampe, Chirp Spread Spectrum for Real Time Locating Systems (online) Sep. 10, 2006, pp. 1-42 XP-002340381.
IEEE Computer Society, IEEE Standard for Information Technology 802.15.4a, Aug. 21, 2007.

* cited by examiner

*Primary Examiner* — Afshawn Towfighi
(74) *Attorney, Agent, or Firm* — Edell, Shapiro & Finnan, LLC

(57) ABSTRACT

A technique is provided to enable a ranging-enhanced communication device that operates according to a legacy communication protocol to transmit a ranging waveform that is not defined in, or part of, the rules of the legacy communication protocol. In one embodiment, a ranging-enhanced communication device that is to transmit the ranging waveform generates information representing a time interval within which to wirelessly transmit a ranging waveform that is not defined by a legacy communication protocol. This information is encoded into a field of a frame that is formatted according to the legacy communication protocol to protect the time interval from transmissions by legacy communication devices that operate according to the legacy communication protocol. The ranging-enhanced communication device transmits the frame and transmits the ranging waveform during the time interval following the frame.

24 Claims, 7 Drawing Sheets

APPENDING A RANGING WAVEFORM TO A FRAME TO MAINTAIN COMMUNICATION PROTOCOL INTEROPERABILITY

FIELD OF THE INVENTION

The present disclosure relates generally to wireless local area network (WLAN) communication.

BACKGROUND

WLANs have proliferated within residential and commercial environments, as have the capabilities of devices that operate in the WLANs. In these environments, it has become important to be able to determine the location of a WLAN device. The communication protocol used by the overwhelming majority of WLANs in the IEEE 802.11 communication protocol, known by the brand WiFi™.

One category of location techniques using information derived from the time of arrival (TOA) or time difference of arrival (TDOA) of signals transmitted by a device whose location is to be determined. However, the existing waveforms defined by the existing rules of the IEEE 802.11 communication protocols (i.e., 802.11a, OFDM variations of 802.11g, 802.11n) do not allow for highly accurate or easily calculated TOA or TDOA location computations using data derived from signals transmitted by one device and received by one or more other devices. There are other types of waveforms that are better suited for TOA or TDOA location techniques, but those waveforms are outside the rules or definitions of the existing IEEE 802.11 communication protocols.

DESCRIPTION OF EXAMPLE EMBODIMENTS

Overview

Devices, protocols or standards that do not include support for a waveform for highly accurate or easily calculated ranging are referred to herein as a "legacy" device, communication protocol or standard. Devices, protocols or standards that include support for a legacy protocol or standard as well as support for a waveform for highly accurate or easily calculated ranging are referred to herein as an "ranging-enhanced" device, communication protocol or standard. The standard or protocol may be one that is promulgated by standardization bodies such as the IEEE or may be a proprietary standard developed by individual entities such as a corporation. There may be first, second, etc., versions of a legacy communication protocol and the signaling techniques described herein may be configured to permit the ranging-enhanced capability of devices while at the same time maintaining interoperability with devices that operate in accordance with the first, second, etc., versions of a legacy communication protocol. Furthermore, the signaling techniques described herein for ranging-enhanced capabilities may be made part of the rules of a version of a communication protocol thereby making it interoperable with communication devices that operate with other versions of the communication protocol, i.e., a legacy communication protocol.

A technique is provided to enable a ranging-enhanced communication device that operates according to a ranging-enhanced communication protocol to transmit a ranging waveform that is not defined in, or part of, the rules of a legacy communication protocol. The ranging waveform may be any waveform that is optimized or suitable for a location computation performed by one or more other communication devices that receive and process the ranging waveform. To this end, a ranging-enhanced communication device that is to transmit the ranging waveform generates information representing a time interval within which to wirelessly transmit a ranging waveform that is not defined by the legacy communication protocol. This information is encoded into a field of a frame that is formatted according to the legacy communication protocol to protect the time interval from transmission by communication devices that operate according to the legacy communication protocol. The frame is transmitted and the ranging waveform is transmitted during the time interval following the frame.

Figure 1:
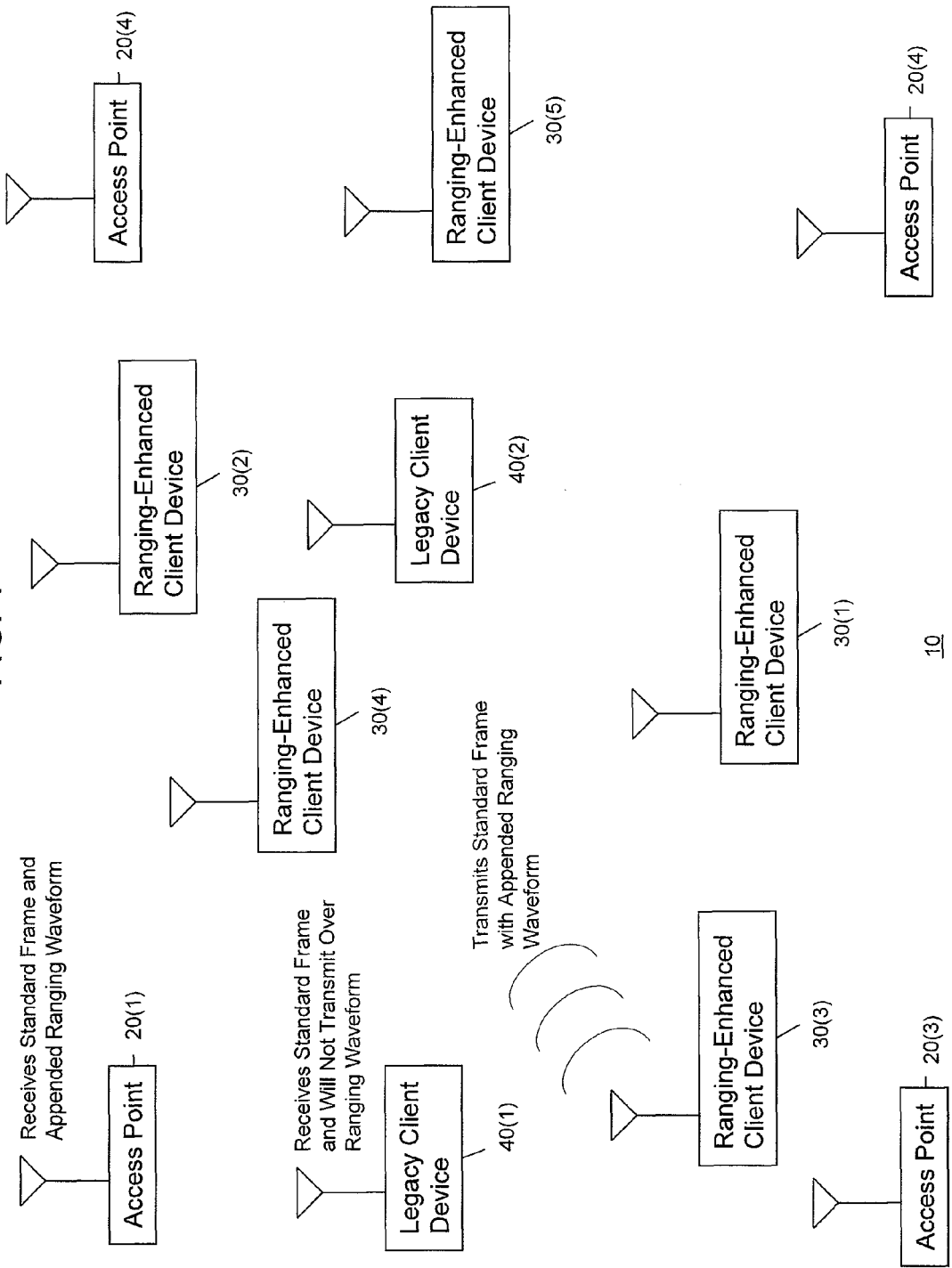
FIG. 1 illustrates an example of a WLAN in which one or more ranging-enhanced communication devices are configured to transmit a ranging waveform that is outside the rules of a legacy communication protocol used by the legacy WLAN communication devices.

Referring first to FIG. 1, a wireless network is shown at 10 comprising a plurality of wireless communication devices. For example, the wireless network 10 is a wireless local area network (WLAN) that uses a legacy wireless communication protocol for communication between and among devices. The communication protocol used by the devices is, for example, an IEEE 802.11 communication protocol, such as IEEE 802.11a, 802.11g, and 802.11n (also known by the brand WiFi™), and any version or variation thereof that is now known or hereinafter developed. While the IEEE 802.11 communication protocols are referred to herein as examples of carrying out the techniques, it should be understand that the present disclosure is not limited to any particular communication protocol.

In the example in which the wireless network 10 is a WLAN, there are four access points (APs) 20(1)-20(4), and two types of client devices. The first type of client device, examples of which are shown at 30(1), 30(2), 30(3), 30(4) and 30(5), are ranging-enhanced client devices that operate in accordance with a ranging-enhanced communication protocol and are capable of transmitting a ranging waveform that is sent as part of a communication protocol frame but is not a defined and recognized signal under the rules of the communication protocol. Client devices 40(1) and 40(2) are legacy client devices because they are capable of operating in accordance with the communication protocol but are not capable of transmitting, receiving and recognizing (and processing) the aforementioned ranging waveform. The APs 20(1)-20(4) are also ranging-enhanced for purposes of the example shown in FIG. 1 in that the APs 20(1)-20(4) can receive and process the ranging waveform transmitted by a ranging-enhanced client device. The number of APs and client devices shown in FIG. 1 is by way of example only. Moreover, it is possible that there are some APs that are legacy devices whereas others are ranging-enhanced devices.

The ranging-enhanced client devices 30(1)-30(5) may be placed into operation in a WLAN where there are legacy client devices 40(1) and 40(2) such that the ranging-enhanced client devices 30(1)-30(5) transmit a ranging waveform without affecting operation of the legacy client devices 40(1) and 40(2) within the rules of a legacy communication protocol, and in so doing, maintain interoperability of legacy client devices with the legacy communication protocol.

The ranging-enhanced client devices 30(1) to 30(5) and the legacy client devices 40(1) and 40(2) are devices that may take any form factor now known or hereinafter developed, such as a client computing device or a radio frequency (RF) tag device. Any ranging-enhanced client device may be further capable of receiving and processing the ranging waveform transmitted by another client device or AP. In general, those communication devices that operate according to the wireless communication protocol but are not capable of transmitting, receiving and processing the ranging waveform are referred to as a plurality of first communication devices, such as the legacy client devices 40(1) and 40(2). Those communication devices that operate according to the wireless communication protocol and are capable of transmitting and/or receiving (and processing) the ranging waveform are referred to herein as a plurality of second communication devices, examples of which are the APs 20(1)-20(4) and the client devices 30(1) to 30(5).

Figure 2:
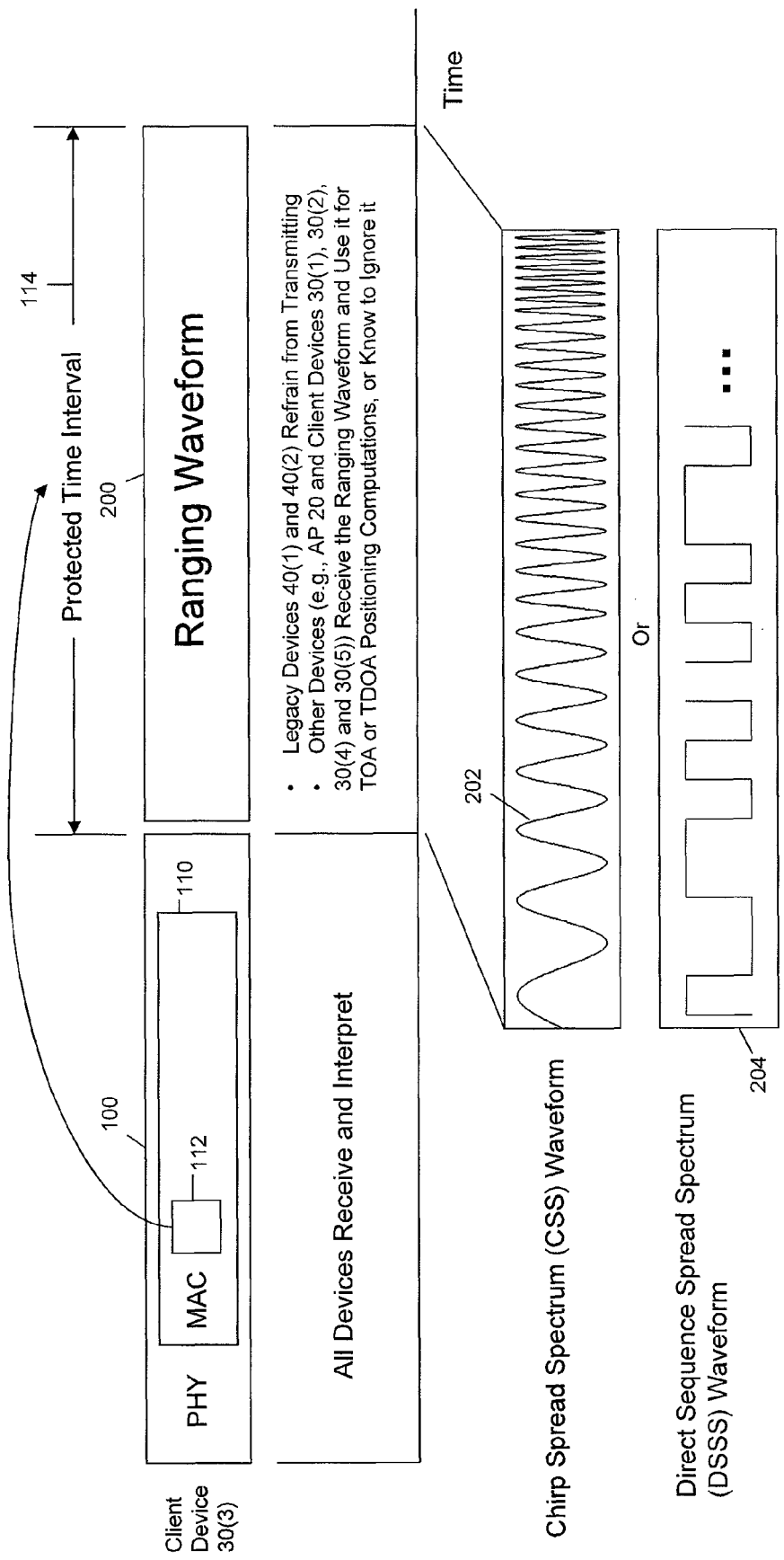
FIG. 2 is a timing diagram that generally illustrates how the ranging waveform is appended to the communication protocol frame.

Referring to FIG. 2 with continued reference to FIG. 1, an example is shown where a particular client device, e.g., client device 30(3), transmits a standard communication protocol frame 100 appended with a ranging waveform 200. The frame 100 comprises a MAC portion 110 and a control field 112 within the MAC portion 110. The control field 112 is encoded, using standard rules of the communication protocol, with information that alerts or notifies all devices that operate in accordance with the communication protocol not to transmit during a time interval 114, referred to herein as a protected time interval. This channel reservation mechanism is how any device operating according to the communication protocol would reserve the channel to transmit data or any other message to another device. However, during the time interval 114, instead of transmitting data or other messages, the client device 30(3) transmits a ranging waveform after the last symbol of the frame 100. The ranging waveform 200, as described above, is not a defined and recognized waveform under the rules of the communication protocol. The legacy client devices 40(1) and 40(2), upon receiving and decoding the control field 112 in the communication protocol frame 100, will know not to transmit during time interval 114 even though they are not capable of receiving and processing the ranging waveform 200. However, the APs 20(1)-20(4) and the client devices 30(1), 30(2), 30(4) and 30(5) are capable of receiving, recognizing and processing the ranging waveform. Therefore, the client devices 30(1), 30(2), 30(4) and 30(5) and the APs 20(1)-20(4) will upon receiving and decoding the control field 112 in the communication protocol frame 100, know not to transmit during the time interval 114 when the client device 30(3) transmits the ranging waveform, but will receive, recognize and, if desired, process the received ranging waveform from client device 30(3). Thus, the desired goal of maintaining interoperability of all devices (legacy and otherwise) with the rules of the communication protocol is maintained even though the ranging waveform is not defined by, or part of, the rules of the legacy communication protocol.

The type of ranging waveform may vary depending on certain location applications. For location procedures that use time of arrival (TOA) or time difference of arrival (TDOA) techniques, the ranging waveform may be a chirp spread spectrum (CSS) waveform 202 or a pseudo-noise direct sequence spread spectrum (DSSS) waveform 204 as shown in FIG. 2. CSS waveforms are known to be advantageous for TOA and TDOA applications, and DSSS waveforms also have similar advantages. As one example, the CSS waveform 202 may be a concatenation of multiple CSS waveforms such as is defined as part of the IEEE 802.15.4a communication protocol.

A host computing device (not shown in FIG. 1) may perform the location computations from data associated with reception of the ranging waveform by the APs 20(1)-20(4) and one or more ranging-enhanced client devices 30(1)-30(5), wherein the ranging waveform is transmitted by a particular client device (or devices) involved in a location procedure. The details of the location computations may vary depending on the type of procedure and are not described herein.

Figure 3:
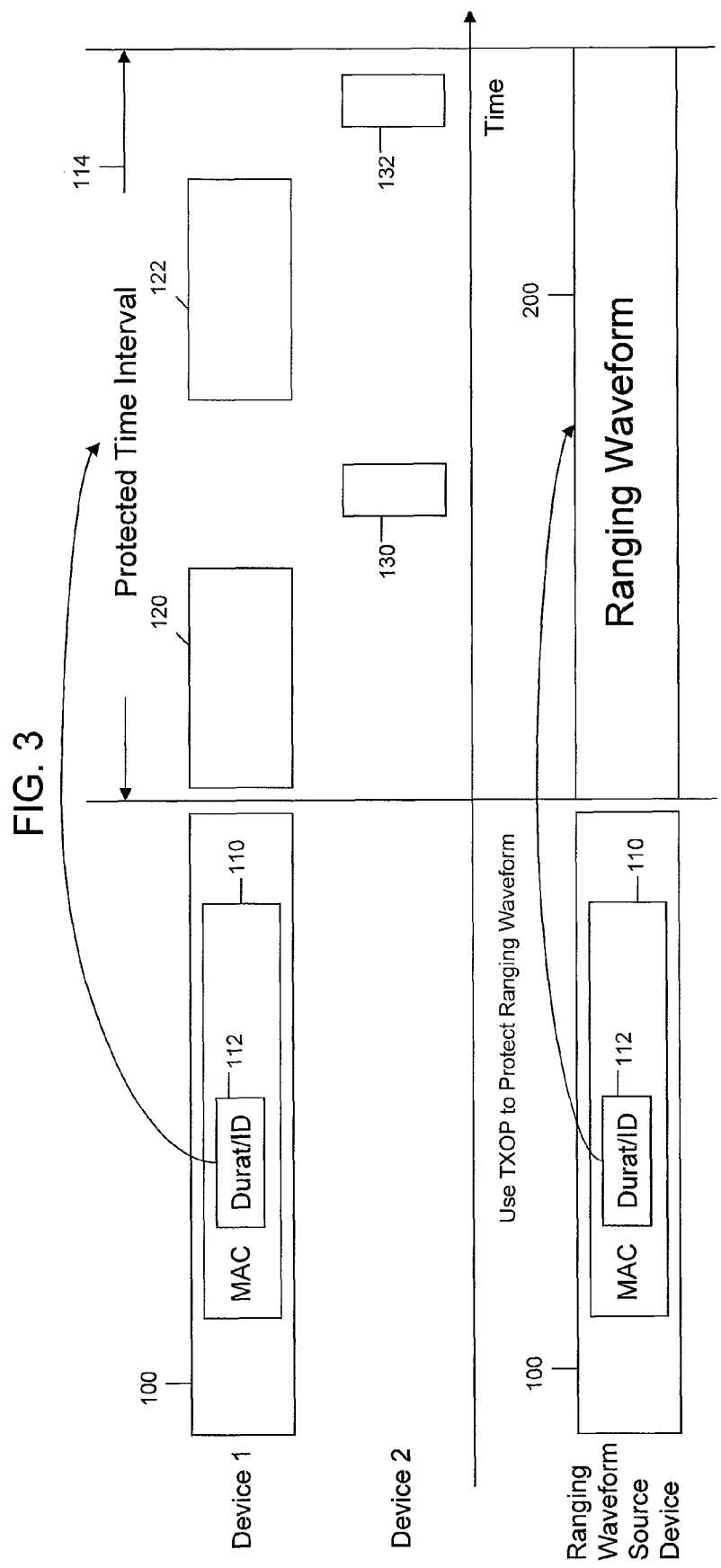
FIG. 3 illustrates examples of timing diagrams depicting a first technique for appending a ranging waveform to a communication protocol frame.

Turning now to FIG. 3, one example of a technique for appending a ranging optimized waveform to a communication protocol frame is described. At the top of FIG. 3, there is generally shown the communication protocol frame 100. There are numerous fields within the MAC portion 110. For example, according to the IEEE 802.11 communication protocol, the MAC portion 110 comprises frame control information, address information and a duration/ID field. In the example of FIG. 3, the control field 112 referred to above is the duration/ID field. The duration/ID field 112 is an example of a field in the frame 100 that is designated for containing information that is used by a communication device to reserve time in a radio frequency channel for transmitting and/or receiving signals according to the communication protocol. A communication device encodes the duration/ID field 112 with information to notify or alert other devices operating in accordance with the communication protocol that they should not transmit for a period of time. The particular coding format of the bits in the duration/ID field 112 are defined by the rules of the IEEE 802.11a communication protocol and are therefore not described herein.

One use of the duration/ID field 112 is to protect a time interval sufficient for a first device, e.g., device 1, to transmit data packets 120 and 122 to a second device, e.g., device 2. Device 2, upon receiving data packet 120 transmits an acknowledgement (ACK) packet 130, and subsequently upon receiving data packet 122 transmits an ACK packet 132. Thus, when device 1 queues up data to send to device 2, device 1 encodes information into the duration/ID field 112 in order to reserve the channel for a time interval 114 for a packet exchange such as the one shown at the top of FIG. 3. Similarly, device 1 may reserve the channel via a request to send (RTS)/clear to send (CTS) exchange with another device. Device 1 encodes information into the duration/ID field 112 in order to reserve a protected time interval necessary for the desired packet exchange. This mechanism is called, in the IEEE 802.11 parlance, a transmit opportunity (TXOP), and is known and performed by all devices that operate in compliance with the communication protocol.

Referring to the bottom of FIG. 3, any device that operates in accordance with the communication protocol may be further configured to transmit a ranging waveform appended to a frame, where the ranging waveform is not defined or part of the communication protocol. The waveforms that are defined in the communication protocol, such as the IEEE 802.11 standard, cannot provide a high degree of location accuracy with low computational complexity. It is desirable to be able to transmit a ranging waveform that is not part of the standard, but is nevertheless optimized or more useful, for certain location procedures, such as TOA and TDOA location techniques. To this end, the TXOP mechanism described above is exploited in order to reserve or protect a time interval during which a ranging waveform (that is not part of the legacy communication protocol rules) is transmitted.

As shown in FIG. 3, when a location procedure is to be performed, a device that is to transmit a ranging waveform generates a frame 100 and encodes information into the duration/ID field 112 that specifies the duration (and implicitly the start and end time) of the time interval 114, according to the rules of the communication protocol, to protect that time interval from transmissions by other communication devices that operate according to the communication protocol. For example, the rules of the communication protocol may provide that the time interval specified in the duration/ID field 112 correspond to a time interval that begins after the last symbol of the frame 100, and lasts for a duration represented by the bits of the duration/ID field. Thus, when communication devices operating according to the communication receive and decode the frame, they are caused to refrain from transmitting on the channel during the time interval 114 when the ranging waveform 200 is transmitted by a particular device. Devices that receive and decode the duration/ID field 112 will know not to transmit during the time interval 114 whether they are capable of recognizing the ranging waveform (e.g., client devices 30(1)-30(5) and the APS 20(1)-20(4) shown in FIG. 1) or not (e.g., the legacy client devices 40(1) and 40(2) shown in FIG. 1). A ranging-enhanced device (AP or client) may be configured to recognize the ranging waveform and store parameters associated with its reception, including time of arrival, etc.

Figure 4:
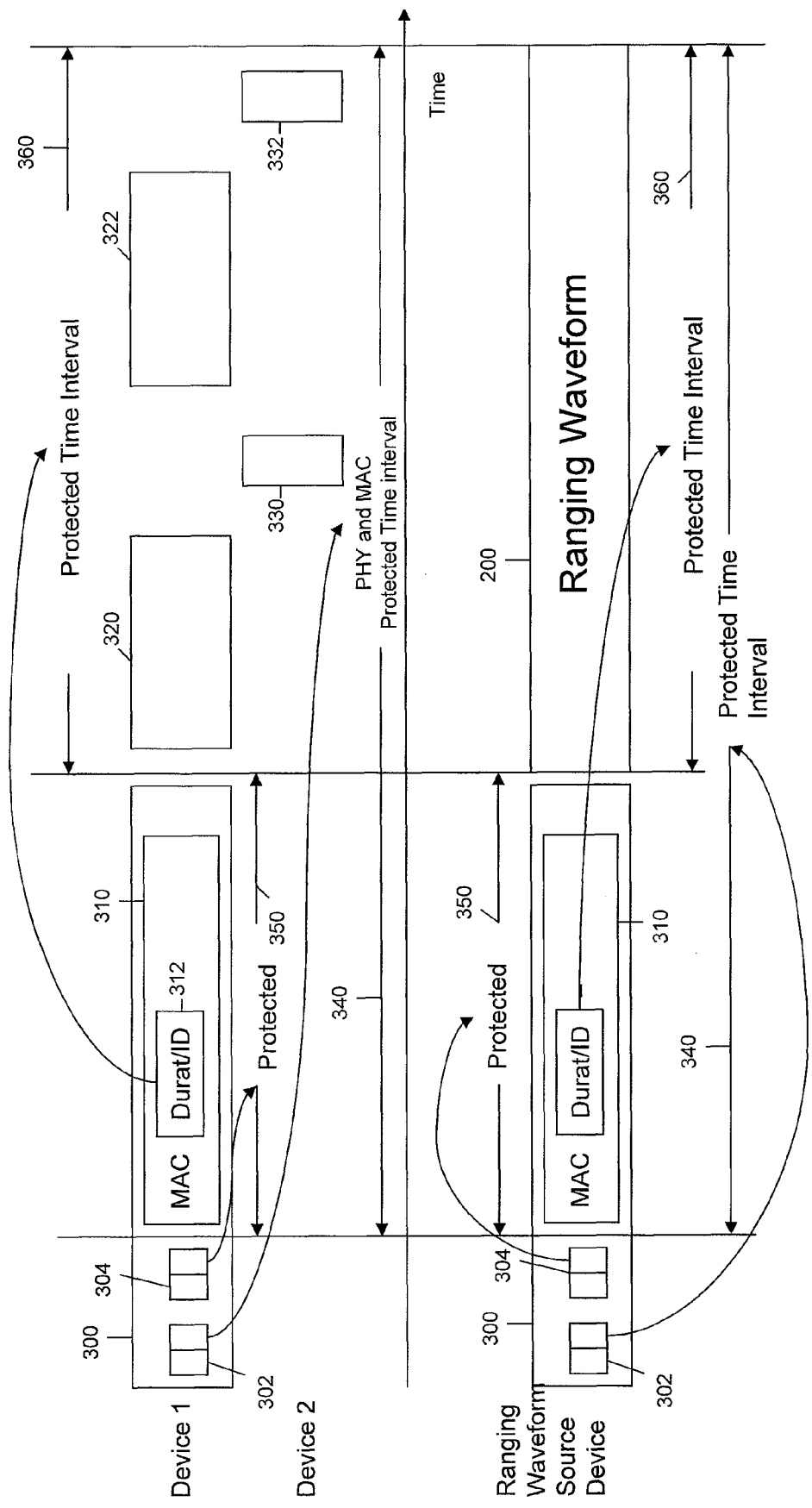
FIG. 4 illustrates examples of timing diagrams depicting a second technique for appending a ranging waveform to a communication protocol frame.

Turning to FIG. 4, another example of a technique to transmit a ranging waveform appended to a communication protocol frame is shown. In this example, the communication protocol is one that has a "mixed-mode" feature in order to accommodate devices that operate in accordance with a first version of the communication protocol and devices that operate in accordance with a second version of the communication protocol. For example, in the IEEE 802.11n communication protocol frame shown at 300, there is a Legacy SIGNAL TXOP (LSIG TXOP) feature in which a first portion of the frame 300 is allocated for a preamble designated for communication devices that operate according to a first version of the 802.11 protocol, e.g., IEEE 802.11a devices. This first portion is at the front or beginning of the frame 300 and includes a message rate and length field shown at 302. There is also a second portion that follows the first portion. The second portion is designated for communication devices that operate according to the second version of the protocol, i.e., 802.11n devices. In this second portion there is an 802.11n preamble that contains a rate and length field 304 for 802.11n devices, although 802.11n devices will also decode the field 302. The frame 300 also comprises a MAC portion 310 much like the frame 100 shown in FIG. 3. Thus, there is a first field in the frame (e.g., field 302) that is designated for communication devices that operate according to a first version of the communication protocol. This first field is intended for use by those communication devices to protect the channel from transmissions by other communication devices that operate according to the first version of the communication protocol during a time interval in order to transmit or receive signals. Similarly, there is a second field (e.g., field 304) that comes after the first field and the second field is intended for use by those communication devices that operate according to the second version of the communication protocol. This second field may be used to instruct communication devices operating according to the second version of the communication protocol to refrain from transmitting for a specified period of time and to further receive and process information contained in the MAC portion 310. It should be understood that the first and second versions of a communication protocol, and more generally these terms are used to indicate that they are two different versions of a communication protocol, and not to indicate that one version came before another version. That is, the first version may have been created after the second version.

Information is normally encoded into the rate and length field 302 that is decoded by IEEE 802.11a devices to determine the duration of the frame 300 and any subsequent packet exchanges such as the data packets 320 and 322, and the ACK packets 330 and 332. When an 802.11a device receives and decodes the field 302, it will know not to transmit for the time interval defined by the bits in that field. This time interval is shown at 340 and can be set to be a relatively long time period that extends from the beginning of the MAC portion 310 of the frame 300 and terminates some time period later defined by the rate and message length field 302.

Thus, according to the technique depicted at the bottom of FIG. 4, in order to alert 802.11a devices not to transmit during a time interval in which the ranging waveform 200 is transmitted, first information is encoded into the rate and length field 302 in the first portion that contains the 802.11a preamble portion of the frame 300. When communication devices that operate in accordance with a prior version of the 802.11n communication protocol (e.g., 802.11a devices) receive and decode the first portion of the frame, those communication devices are caused to refrain from transmitting for a period of time 340 that encompasses the time interval during which the ranging waveform 200 is transmitted. Ranging-enhanced 802.11a devices cannot decode the frame so they do not transmit on top of it. Ranging-enhanced 802.11n devices that receive and decode the frame may recognize the ranging waveform and store time of arrival and other information associated with their reception of the ranging waveform, or they may ignore the ranging waveform if they are not to be part of a location procedure. Legacy 802.11a devices that receive and decode the frame will simply not transmit during the time interval 340 and will not be able to receive and process the ranging waveform; these devices may deem the ranging waveform to be noise.

For devices that are compliant with the 802.11n communication protocol, there is additional special information encoded into other fields of the frame 300 that informs those devices not to transmit for a period of time in order to accommodate a ranging waveform transmission. For example, second information is encoded into the second field referred to above, e.g., the rate and length field 304, designated for 802.11n devices. This second information informs 802.11n devices that the information in the field 302 of the 802.11a preamble was actually a "lie". That is, the second information encoded into the field 304 that protects the time interval 350 corresponding to the MAC portion 310 from transmissions by 802.11n devices so that all 802.11n devices in the range of the source device will be able to receive and decode information in a third field within the MAC portion 310. This third field is, for example, the duration/ID field 312, and it is encoded with third information that protects the time interval 360 (that begins after the MAC portion 310 is completed) from transmissions by 802.11n devices. The time interval 360 is the time interval during which a communication device that operates in accordance with the 802.11n communication protocol may transmit the ranging waveform 200. The time interval 360 is analogous to the time interval 114 shown in FIG. 3.

Thus, when a device that is compliant with the IEEE 802.11n communication protocol decodes the rate and length field 304, it will know to ignore the information in the field 302 and to not transmit for the time interval 350 that follows the second portion of the frame that contains the field 304. It will continue decoding the MAC portion 310 to decode the duration/ID field 312, determine from the duration/ID field 312 that it should refrain from transmitting for the time interval 360 that begins after the end of the MAC portion 310. Ranging-enhanced 802.11n devices that receive and decode the frame may recognize the presence of the ranging waveform via a special element or destination address in the MAC portion of the frame, then process the ranging waveform to gather the time of arrival and other information associated with their reception of the ranging waveform, or they may ignore it if they are not to be part of a location procedure. Legacy 802.11n devices that receive and decode the frame will not transmit during the time interval 360, but will not be able to receive and process the ranging waveform.

The particular coding scheme used for encoding information into the first, second and third fields referred to above (i.e., fields 302, 304 and 312) may vary depending on the particular communication protocol involved. In one example, if the communication protocol is 802.11n, then the 802.11n rules for encoding time interval information into those fields are used.

Figure 5:
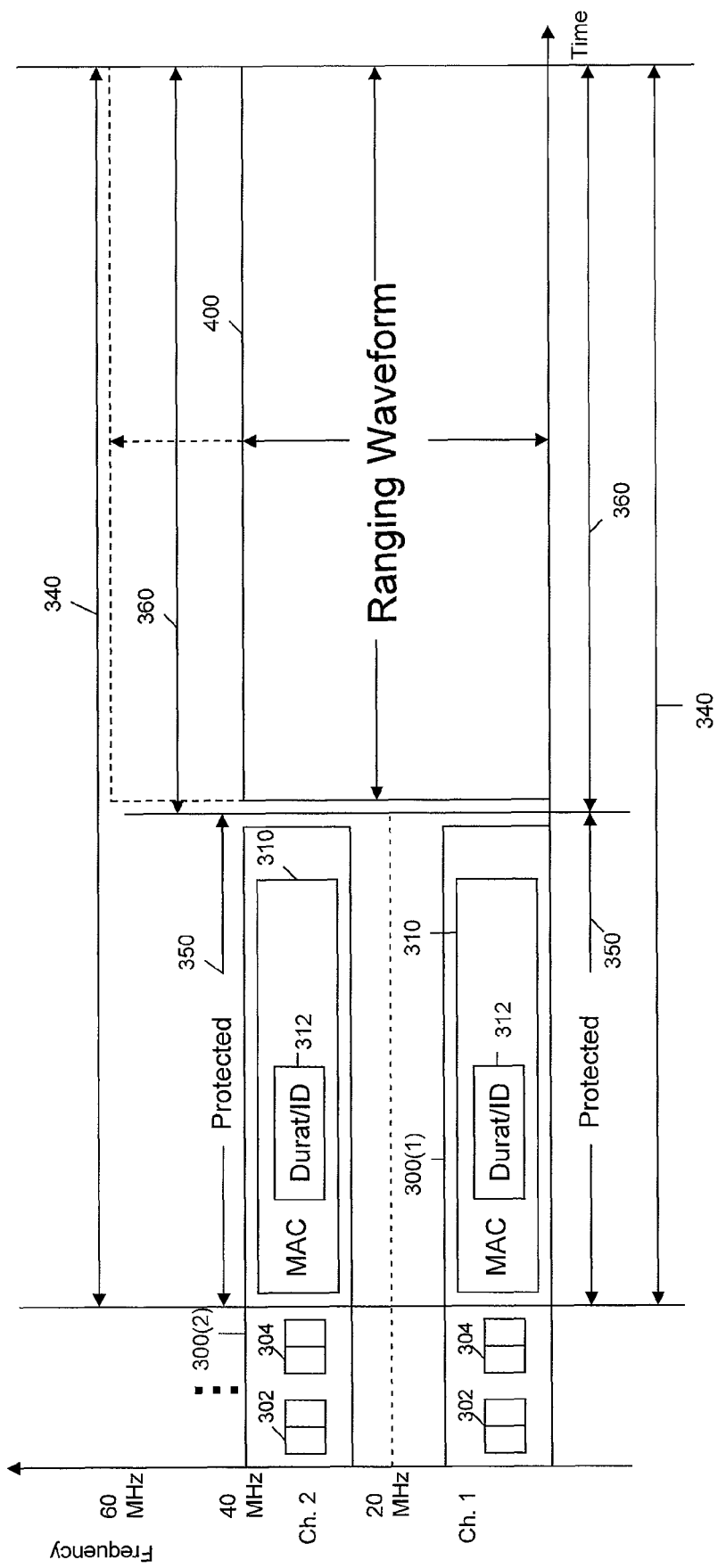
FIG. 5 illustrates examples of timing diagrams depicting a third technique for appending a wide bandwidth ranging waveform to a communication protocol frame.

Turning to FIG. 5, a technique is shown to append a wide bandwidth ranging waveform to an 802.11n communication protocol frame. The technique expands upon the concepts described above in connection with FIG. 4. The 802.11n communication protocol has a duplicate mode that enables transmission of signals on two adjacent channels. In this technique, a ranging waveform is appended to two or more 802.11n frames on adjacent channels such that the ranging waveform can have a bandwidth that occupies more than one radio frequency channel. For example, FIG. 5 shows a communication frame 300(1) on a first channel (e.g., channel 1) that extends a predetermined bandwidth, e.g., 20 MHz, and a communication frame 300(2) on an adjacent second channel (e.g., channel 2) that extends a predetermined bandwidth. The same information is encoded into the fields 302, 304 and 312 of frames 300(1) and 300(2) (on the adjacent channels) using the techniques described above in connection with FIG. 3 in order to protect the time interval 360 on the two adjacent channels for transmitting a ranging waveform 400 that has a bandwidth equal to the bandwidth of both channel combined, e.g., 40 MHz. This technique can be expanded into three or more adjacent channels to transmit a ranging waveform on three or more adjacent channels (e.g., 60 MHz), where the fields 302, 304 and 312 of the frames in each of a plurality of adjacent radio frequency channels.

A ranging waveform such as a CSS or DSSS ranging waveform yields more accurate location results as its bandwidth increases. FIG. 5 illustrates a technique by which the bandwidth of an otherwise non-compliant ranging waveform can be increased. To generalize, FIG. 5 depicts a technique in which information may be encoded into at least one field of each of a plurality of frames that are formatted according to the communication protocol for transmission in corresponding ones of a plurality of adjacent radio frequency channels to thereby reserve a time interval on each of the adjacent radio frequency channels to transmit a ranging waveform that has a bandwidth that occupies two or more of the adjacent radio frequency channels.

When a device transmits a ranging waveform, it can use any of the distributed coordinated function (DCF) mechanisms of the IEEE 802.11 protocols and can send any data payload (including application data) in the transmission, followed by the ranging waveform. For example, the data payload may comprise any application data that notifies the recipient device(s) of a parameter of the transmitting device such as battery level, an identifier message, sensor data measured by a device, etc.

Furthermore, the techniques of this disclosure may be used to supplement the location techniques (now known or hereinafter developed) that rely on reception of standard waveforms defined by the applicable communication protocol. For example, the ranging waveform referred to herein may be useful in computing more accurate location than could otherwise be computed based solely on the standard waveforms that defined the communication protocol. For example, a first set of location computations may be made based on reception of standard 802.11 packets and a second set of locations may be made from the ranging waveform that is appended to a frame that contains the same standard 802.11 packets. The two sets of location computations may then be used to produce a single more accurate location of the source device.

Figure 6:
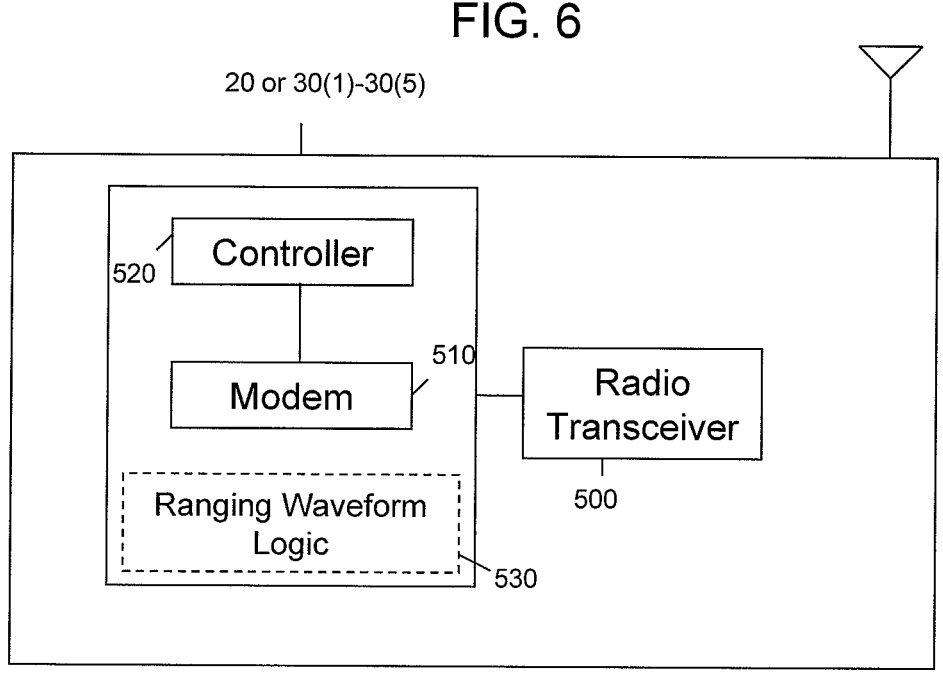
FIG. 6 is a block diagram illustrating an example of a ranging-enhanced communication device configured to transmit the ranging waveform.

Referring to FIG. 6, a block diagram showing an example of an AP or client device that is capable of transmitting and/or receiving the ranging waveform using the techniques described above. Each device comprises a radio transceiver 500, a modem 510 and a controller 520. The radio transceiver 500 performs the radio frequency (RF) upconversion for transmitting signals and RF downconversion for receiving signals. The modem 510 and controller 520 cooperate to perform the basic control and baseband communication processing (encoding, decoding, framing etc.) functions of the device according to a communication protocol. Additionally, ranging waveform logic 530 is provided to augment the functions of the modem 510 and the controller 520. The ranging waveform logic 530 is shown as a separate block in FIG. 6 for illustration purposes only. One with ordinary skill in the art would understand that the ranging waveform logic 530 may be implemented as part of either the modem 510 or the controller 520, or portions of the ranging waveform logic 530 may reside in both the modem 510 and the controller 520. The modem 510, controller 520 and ranging waveform logic 530 may be part of a chipset comprised of several integrated circuits (ICs) or may be implemented in a single IC. If a device, such as a client device, is designed to transmit a ranging waveform (and not receive and process the waveform), then the ranging waveform logic 530 is configured to generate and transmit the ranging waveform according to any of the techniques described herein. If a device, such as an AP or a client device, is to receive and process a ranging waveform transmitted by another device, then the ranging waveform logic 530 is configured to decode fields in a received frame from another device to detect when the device is about to send a ranging waveform, and to receive and process the ranging waveform. In some devices, the ranging waveform logic 530 may be configured to generate and transmit the ranging waveform for reception by other devices, and to receive and process the ranging waveform transmitted by another device. The modem 510, controller 520 and ranging waveform logic 530 each may be implemented by logic encoded in one or more tangible media (e.g., embedded logic such as an application specific IC, digital signal processor instructions, software that is executed by a processor, etc.).

Figure 7:
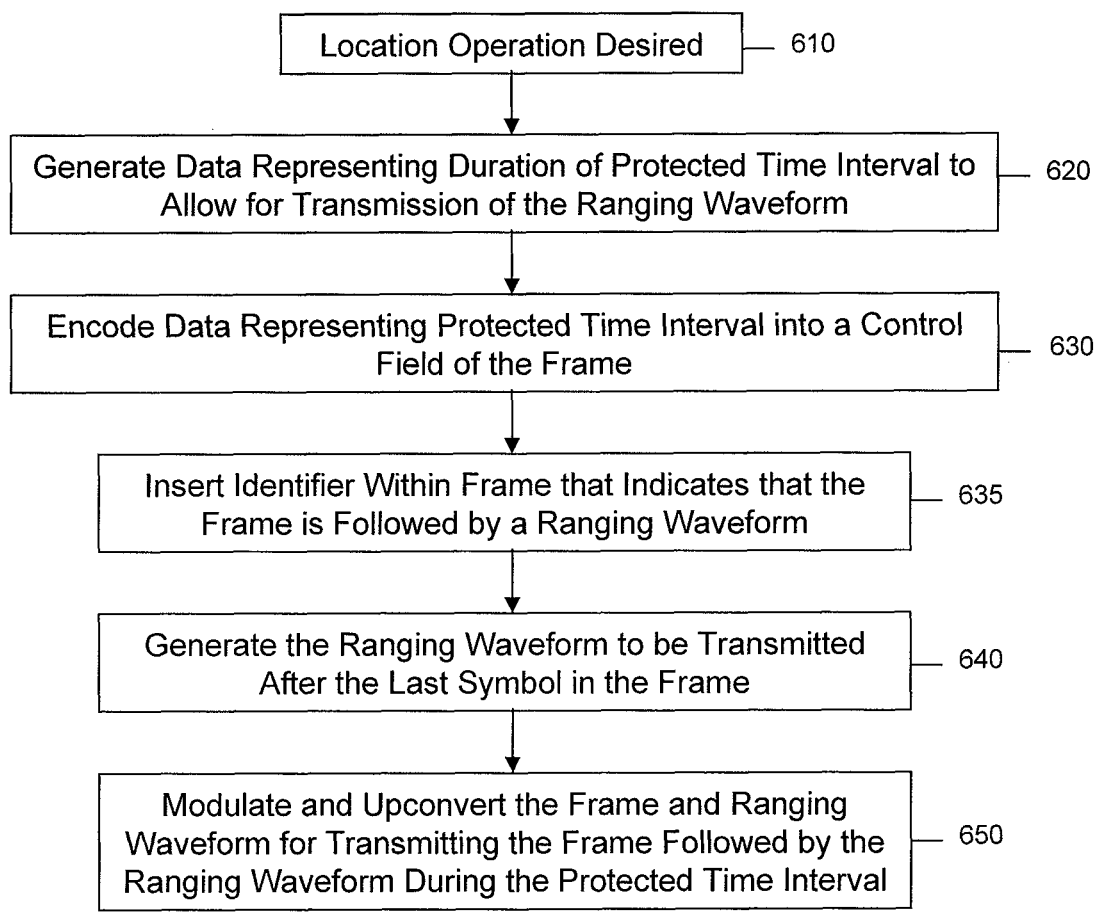
FIG. 7 is a flow chart illustrating an example of a method by which a ranging-enhanced communication device transmits the ranging waveform appending to a communication protocol frame.

Turning to FIG. 7 with continued reference to FIG. 6, a flow chart is shown that illustrates an example of a method 600 by which a communication device transmits the ranging waveform. At 610, a device (such as the controller 520) determines that a location operation is desired for any of a variety of reasons, or is otherwise commanded to perform a location operation. At 620, the ranging waveform logic 530 in the communication device generates data representing the duration of the protected time interval needed to transmit the ranging waveform. At 630, the ranging waveform logic 530 in the communication device encodes the data representing the protected time interval into a standard field (or fields) of the communication protocol frame as if the communication device were going to transmit any data or messages under the rules of the communication protocol. The type of encoding performed at 630 depends on the particular communication protocol involved and, for example, may be performed using the schemes described above in connection with FIG. 3, 4 or 5. At 635, an identifier or flag is inserted within the frame that indicates that the frame is followed by a ranging waveform. For example, the identifier may be a special destination address or a special information element (i.e. a special type length value (TLV)). At 640, the ranging waveform logic 530 and/or the modem 510 generates the ranging waveform to be transmitted after the last symbol in the communication protocol frame. At 650, the modem modulates the frame and the ranging waveform and the radio transceiver 500 upconverts the frame for transmission followed by the ranging waveform during the protected time interval.

The concepts described herein may be embodied in other specific forms without departing from the spirit or essential characteristics thereof. The foregoing embodiments are therefore to be considered in all respects illustrative and not meant to be limiting.

What is claimed is:

1. A method comprising:
generating information representing a time interval within which to wirelessly transmit a ranging waveform that is not defined by a legacy communication protocol;
encoding the information into a field of a frame that is formatted according to the legacy communication protocol so that communication devices which operate according to the legacy communication protocol that receive the frame and decode the field are caused not to transmit during the time interval;
transmitting the frame in a radio frequency channel; and
transmitting the ranging waveform in the radio frequency channel during the time interval following the frame, the ranging waveform being any waveform that is optimized or suitable for a location computation performed by one or more communication devices that are capable of receiving and processing the ranging waveform.

2. The method of claim 1, wherein the field is a standard field designated for containing information that is used by a communication device to reserve time in the radio frequency channel for transmitting and/or receiving signals according to the legacy communication protocol.

3. The method of claim 1, wherein the frame comprises a first portion that is designated for communication devices that operate according to a first version of the legacy communication protocol and a second portion that is designated for communication devices that operate according to a second version of the legacy communication protocol, and wherein encoding comprises encoding first information into a first field within the first portion of the frame so that communication devices which operate according to the first version of the legacy communication protocol that receive the frame and decode the first field are caused not to transmit for a period of time that encompasses the time interval.

4. The method of claim 3, wherein the frame comprises a media access control portion, wherein encoding comprises encoding second information into a second field that is within the second portion so that communication devices that operate according to the second version of the legacy communication protocol that receive the frame and decode the second field are caused not to transmit for a period of time during the media access control portion of the frame that follows the second portion of the frame, and encoding third information into a third field that is within the media access control portion of the frame so that communication devices which operate according to the second version of the legacy communication protocol that receive the frame and decode the third field are caused not to transmit during the time interval.

5. The method of claim 1, wherein encoding comprises encoding the information into the field of each of a plurality of frames that are formatted according to the legacy communication protocol for transmission in corresponding ones of a plurality of radio frequency channels, and transmitting the ranging waveform comprises transmitting the ranging waveform with a bandwidth that occupies two or more of the radio frequency channels.

6. The method of claim 1, and further comprising encoding data for transmission during a period of time after the field and prior to the time interval during which the ranging waveform is to be transmitted.

7. The method of claim 1, wherein the ranging waveform is a chirp spread spectrum waveform, or a concatenation of multiple chirp spread spectrum waveforms.

8. The method of claim 1, wherein the ranging waveform is a pseudo-noise direct sequence spread spectrum waveform.

9. A system comprising:
a plurality of first communication devices that are configured to operate according to a legacy wireless communication protocol in a radio frequency channel; and
a plurality of second communication devices that are configured to operate according to the legacy wireless communication protocol in the radio frequency channel, and wherein the plurality of second communication devices are further configured to transmit and receive a ranging waveform in the radio frequency channel that is not defined by the legacy wireless communication protocol and which the plurality of first communication devices cannot receive and process, the ranging waveform being any waveform that is optimized or suitable for a location computation performed by one or more second communication devices that are capable of receiving and processing the ranging waveform;
wherein a particular second communication device is configured to transmit the ranging waveform by transmitting a frame formatted according to the legacy wireless communication protocol that contains a field comprising information that indicates a time interval during which the particular second communication device transmits the ranging waveform so that first communication devices that receive the frame and decode the field are caused to refrain from transmitting during the time interval.

10. The system of claim 9, wherein the frame comprises a first portion designated for first communication devices that operate according to a first version of the legacy wireless communication protocol and a second portion that is designated for first communication devices that operate according to a second version of the legacy wireless communication protocol, and wherein the particular second communication device is configured to encode first information into a first field that is within the first portion to cause first communication devices that operate in accordance with the first version of the legacy wireless communication protocol that receive the frame and decode the first field to refrain from transmitting for a period of time that encompasses the time interval.

11. The system of claim 10, wherein the frame comprises a media access control portion, wherein the particular second communication device is configured to encode second information into a second field that is within the second portion to cause first communication devices that operate in accordance with the second version of the legacy wireless communication protocol that receive the frame and decode the second portion to refrain from transmitting for a period of time during the media access control portion of the frame that follows the second portion of the frame, and wherein the particular second communication device is configured to encode third information into a third field that is within the media access control portion of the frame to cause first communication devices that operate in accordance with the second version of the legacy wireless communication protocol that receive the frame and decode the third field to refrain for transmitting during the time interval.

12. The system of claim 9, wherein the particular communication device is configured to encode the information into a field of each of a plurality of frames that are formatted according to the legacy wireless communication protocol for transmission in corresponding ones of a plurality of radio frequency channels, and the particular second communication device transmits the ranging waveform having a bandwidth that occupies two or more of the radio frequency channels.

13. An apparatus comprising:
a radio transceiver that is configured to transmit and receive signals in a radio frequency channel;
a modem connected to the radio transceiver that is configured to baseband modulate signals to be transmitted according to a legacy communication protocol and to baseband demodulate received signals according to the legacy communication protocol;
a controller connected to the modem that is configured to control the modem and the radio transceiver;
wherein at least one of the controller or the modem is configured to generate information representing a time interval within which to wirelessly transmit in the radio frequency channel a ranging waveform that is not defined by the legacy communication protocol, encode the information into a field of a frame that is formatted according to the legacy communication protocol so that communication devices which operate according to the legacy communication protocol that receive the frame and decode the field are caused not to transmit during the time interval, and generates the ranging waveform for transmission during the time interval following the frame, the ranging waveform being any waveform that is optimized or suitable for a location computation performed by one or more communication devices that are capable of receiving and processing the ranging waveform.

14. The apparatus of claim 13, wherein the controller or the modem is configured to encode the information into a field of the frame that is designated for containing information that is used by a communication device to reserve time in a radio frequency channel for transmitting and/or receive signals according to the legacy communication protocol.

15. The apparatus of claim 13, wherein the controller or the modem is configured to encode first information into a first field that is within a first portion of the frame that is designated for communication devices that operate according to a first version of the legacy communication protocol so that communication devices which operate according to the first version of the legacy communication protocol that receive the frame and decode the first field are caused not to transmit for a period of time that encompasses the time interval.

16. The apparatus of claim 15, wherein the controller or the modem is configured to encode second information into a second field that is within a second portion of the frame that is designated for communication devices that operate according to a second version of the legacy communication protocol so that communication devices that operate according to the second version of the legacy communication protocol that receive the frame and decode the second field are caused not to transmit for a time period corresponding to a media access control portion of the frame that follows the second portion of the frame, and to encode third information into a third field that is within the media access control portion of the frame so that communication devices which operate according to the second version of the legacy communication protocol that receive the frame and decode the third field are caused not to transmit during the time interval.

17. The apparatus of claim 13, wherein the controller or modem is configured to encode the information into a field of each of a plurality of frames that are formatted according to the legacy communication protocol for transmission in corresponding ones of a plurality of radio frequency channels, and to generate the ranging waveform having a bandwidth that occupies two or more of the radio frequency channels.

18. The apparatus of claim 13, wherein the modem or controller is configured to encode data for transmission during a period of time after the field and prior to the time interval during which the ranging waveform is to be transmitted.

19. The apparatus of claim 13, wherein the modem or the controller is configured to generate at least one chirp spread spectrum waveform as the ranging waveform.

20. The apparatus of claim 13, wherein the modem or the controller is configured to generate a pseudo-noise direct sequence spread spectrum waveform as the ranging waveform.

21. One or more non-transitory processor readable media storing software instructions for execution by a processor and when executed operable to:
generate information representing a time interval within which to wirelessly transmit a ranging waveform that is not defined by a legacy communication protocol;
encode the information into a field of a frame that is formatted according to the legacy communication protocol so that communication devices which operate according to the legacy communication protocol that receive the frame and decode the field are caused not to transmit during the time interval;
cause transmission of the frame in a radio frequency channel; and
cause transmission of the ranging waveform in the radio frequency channel during the time interval following the frame, the ranging waveform being any waveform that is optimized or suitable for a location computation performed by one or more communication devices that are capable of receiving and processing the ranging waveform.

22. The non-transitory processor readable media of claim 21, wherein the frame comprises a first portion that is designated for communication devices that operate according to a first version of the legacy communication protocol and a second portion that is designated for communication devices that operate according to a second version of the legacy communication protocol, and wherein the instructions operable to encode comprise instructions operable to encode first information into a first field within the first portion of the frame so that communication devices which operate according to the first version of the legacy communication protocol that receive the frame and decode the first field are caused not to transmit for a period of time that encompasses the time interval from transmissions.

23. The non-transitory processor readable media of claim 22, wherein the frame comprises a media access control portion, and wherein the instructions operable to encode comprise instructions operable to:

encode second information into a second field that is within the second portion so that communication devices that operate according to the second version of the legacy communication protocol that receive the frame and decode the second field are caused not to transmit for a period of time during the media access control portion of the frame that follows the second portion of the frame; and encode third information into a third field that is within the media access control portion of the frame so that communication devices which operate according to the second version of the legacy communication protocol that receive the frame and decode the third field are caused not to transmit during the time interval.

24. The non-transitory processor readable media of claim 21, wherein the instructions operable to encode comprise instructions operable to encode the information into the field of each of a plurality of frames that are formatted according to the legacy communication protocol for transmission in corresponding ones of a plurality of radio frequency channels such that the bandwidth of the ranging waveform occupies two or more of the radio frequency channels.

* * * * *